United States Patent
Ciochina-Duchesne et al.

(10) Patent No.: US 10,256,927 B2
(45) Date of Patent: Apr. 9, 2019

(54) METHOD AND DEVICE FOR DETERMINING POWER OF AT LEAST ONE CROSSPOLAR INTERFERER IN FRAME

(71) Applicant: MITSUBISHI ELECTRIC CORPORATION, Tokyo (JP)

(72) Inventors: Cristina Ciochina-Duchesne, Rennes (FR); Loic Brunel, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 88 days.

(21) Appl. No.: 15/504,285

(22) PCT Filed: Nov. 19, 2015

(86) PCT No.: PCT/JP2015/083301
§ 371 (c)(1),
(2) Date: Feb. 15, 2017

(87) PCT Pub. No.: WO2016/084920
PCT Pub. Date: Jun. 2, 2016

(65) Prior Publication Data
US 2017/0244502 A1    Aug. 24, 2017

(30) Foreign Application Priority Data
Nov. 27, 2014 (EP) .................... 14195089

(51) Int. Cl.
H04B 7/00 (2006.01)
H04B 7/185 (2006.01)
H04B 17/309 (2015.01)

(52) U.S. Cl.
CPC .......... *H04B 17/309* (2015.01); *H04B 7/002* (2013.01); *H04B 7/18513* (2013.01)

(58) Field of Classification Search
CPC .. H04B 17/309; H04B 7/002; H04B 7/18513; H04B 1/10; H04B 2001/1045;
(Continued)

(56) References Cited

U.S. PATENT DOCUMENTS 5,901,343 A      5/1999 Lange
2003/0224723 A1*  12/2003 Sun .................... H04B 7/18528
                                              455/12.1
(Continued)

FOREIGN PATENT DOCUMENTS

WO    WO 2008/066968 A2    6/2008

OTHER PUBLICATIONS

Ordano et al. ("Dual Polarised Propagation Channel: Theoretical Model and Experimental Results," 10th International Conference on Antennas and Propagation, Apr. 14-17, 1997, Conference Publication No. 436, pp. 2.363-2.366 (Year: 1997).*

*Primary Examiner* — Joshua Kading
*Assistant Examiner* — Lalita W Pace
(74) *Attorney, Agent, or Firm* — Birch, Stewart, Kolasch & Birch, LLP

(57) ABSTRACT

The present invention concerns a method for determining a power of at least one crosspolar interferer in a frame received by a receiver comprising at least a first and a second receive antennas detecting a first and a second polarization, the frame being transmitted from a satellite transmitter comprising at least a first and a second transmit antennas, the first transmit antenna being used for transferring signal representative of the frames to the receiver on the first polarization, the second transmit antenna being used for transferring signal to another receiver using the same frequency and the second polarization. The method comprises the steps of: —obtaining the antenna gains between the satellite transmitter and the receiver, —estimating a value of (Continued)

the atmospheric attenuation between the satellite transmitter and the receiver, a crosspolar attenuation, the channels between the first and second transmit antennas and the receiver, —estimating the power of the at least one interferer from the obtained antennas gains and estimations.

13 Claims, 3 Drawing Sheets

(58) Field of Classification Search
CPC ............ H04B 2001/7152; H04B 1/126; H04B 15/00; H04B 10/6162; H04B 10/6166; H04B 7/22; H04B 7/10; H04W 28/0236
See application file for complete search history.

(56) References Cited

U.S. PATENT DOCUMENTS

| | | | |
|---|---|---|---|
| 2009/0086862 A1* | 4/2009 | Thesling | H04B 7/10 375/346 |
| 2012/0188880 A1 | 7/2012 | Beeler et al. | |
| 2013/0303080 A1* | 11/2013 | Moreno | H04J 11/004 455/9 |

* cited by examiner

METHOD AND DEVICE FOR DETERMINING POWER OF AT LEAST ONE CROSSPOLAR INTERFERER IN FRAME

TECHNICAL FIELD

The present invention relates generally to a method and a device for determining a power of at least one crosspolar interferer in a frame received by a receiver.

BACKGROUND ART

In satellite communication systems, multibeam satellites are used for increasing the system capacity. In order to improve the frequency reuse factor without significantly increasing the interference, adjacent beams usually make use of the same frequency with different polarizations. In the adjacent beams, independent signals may be transmitted onto the same frequency band by means of two orthogonal polarizations, like for example horizontal and vertical polarizations. Impairments appear when the polarized waveform travels through the troposphere. Besides waveform attenuation, rain and ice depolarization effects are also present and the orthogonality may be lost, which leads to crosstalk between the two polarizations.

The severity of this effect depends on the operating frequency, atmospheric conditions, correct antenna calibration/alignment, etc.

Crosspolar interference causes performance degradation for the users able to receive both signals.

Mitigation techniques may be employed in order to reduce crosspolar interference. Many such techniques already exist in the literature, for example, joint minimum mean square error detection, with or without successive interference cancellation, turbo receivers.

The existence and the nature of the interferer need to be known in order for the mitigation techniques to be efficient.

SUMMARY OF INVENTION

Technical Problem

Transmissions from a satellite to receivers on different polarizations are usually not coordinated. For a given receiver, the useful and the interfering signal frames may be not aligned, i.e. frames have different start/end positions in the time plane and they potentially occupy different bandwidths, pilot positions are different between the interfering frames, etc.

Solution to Problem

The present invention aims at determining, in received signals, if crosspolar interference mitigation needs to be performed. To that end, the present invention concerns a method for determining a power of at least one crosspolar interferer in a frame received by a receiver comprising at least a first and a second receive antennas detecting a first and a second polarization, the frame being transmitted from a satellite transmitter comprising at least a first and a second transmit antennas, the first transmit antenna being used for transferring signal representative of the frames to the receiver on the first polarization, the second transmit antenna being used for transferring signal to another receiver using the same frequency and the second polarization, characterized in that the method comprises the steps of:

obtaining the antenna gains between the satellite transmitter and the receiver,
estimating an atmospheric attenuation between the satellite transmitter and the receiver,
estimating a crosspolar attenuation,
estimating the channel between the first transmit antenna and the receiver taking into account that the channel is static during the transfer of the frame,
estimating the channel between the second transmit antenna and the receiver from the antenna gain between the second transmit antenna and the receiver and from the atmospheric attenuation,
estimating the power of the at least one interferer from the obtained antennas gains and estimations.

The present invention concerns also a device for determining a power of at least one crosspolar interferer in a frame received by a receiver comprising at least a first and a second receive antennas detecting a first and a second polarization, the frame being transmitted from a satellite transmitter comprising at least a first and a second transmit antennas, the first transmit antenna being used for transferring signal representative of the frames to the receiver on the first polarization, the second transmit antenna being used for transferring signal to another receiver using the same frequency and the second polarization, characterized in that the device comprises:

means for obtaining the antenna gains between the satellite transmitter and the receiver,
means for estimating an atmospheric attenuation between the satellite transmitter and the receiver,
means for estimating a crosspolar attenuation,
means for estimating the channel between the first transmit antenna and the receiver taking into account that the channel is static during the transfer of the frame,
estimating the channel between the second transmit antenna and the receiver from the antenna gain between the second transmit antenna and the receiver and from the atmospheric attenuation,
means for estimating the power of the at least one interferer from the obtained antennas gains and estimations.

Thus, the receiver is able to implement interference mitigation schemes.

According to a particular feature, the antenna gains between the satellite transmitter and the receiver are obtained from information related to the location of the receiver, related to the satellite transmitter and related to the receiver antenna gains.

Thus, antenna gains can be obtained at the receiver.

According to a particular feature, the estimated value of the atmospheric attenuation is computed based on signals received by the receiver through the first receive antenna on pilot symbol positions in the frame transferred by the satellite transmitter through the first transmit antenna.

Thus, the atmospheric attenuation can be estimated at the receiver.

According to a particular feature, the estimated value of the atmospheric attenuation is determined according to the following formula:

$$\tilde{b} = E\{z^* y_1'\}/(a_1 E\{|z|^2\})$$

where $E\{.\}$ is the mean value computed on at most all the pilot symbol positions in the frame, z denotes pilot symbols, * denotes the complex conjugate, $y_1'$ is the signal received by the receiver through the first receive antenna on pilot symbol positions in the frame transferred by the satellite transmitter through the first transmit antenna, and $a_1$ is the antenna gain between the first transmit antenna and the first receive antenna.

Thus, the estimated value of the atmospheric attenuation can be computed based on received signals and on known pilot sequence and pilot symbol positions.

According to a particular feature, the estimated value of the atmospheric attenuation is determined according to the following formula:

$$\tilde{b} = \tilde{h}_1 / a_1$$

where $a_1$ is the antenna gain between the first transmit antenna and the first receive antenna and $\tilde{h}_1$ is the estimated value of the channel between the first transmit antenna and the receiver.

Thus, the estimated value of the atmospheric attenuation can be computed based on classical channel estimation methods.

According to a particular feature, the estimated value of the crosspolar attenuation is computed based on the estimated value of the atmospheric attenuation.

Thus, the estimated value of the crosspolar attenuation can be computed without prior knowledge of the parameters of the crosspolar interferer.

According to a particular feature, the estimated crosspolar attenuation is $$\tilde{A} = E\{z^* y_2'\} / (a_1 \tilde{b} E\{|z|^2\})$$

where $y_2'$ is the signal received by the receiver through the second receive antenna on pilot symbol positions in the frame transferred by the satellite transmitter through the first transmit antenna.

Thus, the estimated value of the crosspolar attenuation can be computed based on received signals and prior estimations.

According to a particular feature, the estimated crosspolar attenuation is $$\tilde{A} = E\{z^* y_2'\} / E\{z^* y_1'\}$$

Or $$\tilde{A} = E\{z^* y_2'\} / (\tilde{h}_1 E\{|z|^2\})$$

where $y_2'$ is the signal received by the receiver through the second receive antenna on pilot symbol positions in the frame transferred by the satellite transmitter through the first transmit antenna.

Thus, the estimated value of the crosspolar attenuation can be computed based only on received signals.

According to a particular feature, the estimated interferer power is $$\tilde{\sigma}_{s_2}^2 = \frac{(E\{|y_1' - a_1 \tilde{b} z|^2\} - \sigma_n^2) \cdot |a_2 \tilde{b} \tilde{A}|^2 + (E\{|y_2' - a_1 \tilde{b} \tilde{A} z|^2\} - \sigma_n^2) \cdot |a_2 \tilde{b}|^2}{|a_2 \tilde{b} \tilde{A}|^4 + |a_2 \tilde{b}|^4}$$

where $a_2$ is the antenna gain between the second transmit antenna and the second receive antenna, the averaging function $E\{.\}$ operates over several subcarriers/time slots of the frame during which the nature of the interference does not change and $\sigma_n^2$ is the variance of additive white Gaussian noise on the antennas of the receiver.

Thus, the receiver is able to estimate the power of a crosspolar interferer without any prior knowledge of the interferer's parameters (e.g. modulation and coding scheme, pilot positions, pilot sequence . . . ).

$$\tilde{\sigma}_{s_2}^2 = (E\{|y_1' - a_1 \tilde{b} z|^2\} - E\{|y_2' - a_1 \tilde{b} \tilde{A} z|^2\}) / (|a_2 \tilde{b} \tilde{A}|^2 - |a_2 \tilde{b}|^2)$$

where $a_2$ is the antenna gain between the second transmit antenna and the second receive antenna, the averaging function $E\{.\}$ operates over several subcarriers/time slots during which the nature of the interference does not change.

Thus, the receiver is able to estimate the power of a crosspolar interferer without any prior knowledge of the interferer's parameters or of the additive white Gaussian noise on the antennas of the receiver.

According to a particular feature, the estimated value of the channel between the second transmit antenna and the receiver $\tilde{h}_2$ is estimated by computing:

$$\tilde{h}_2 = a_2 \tilde{b}$$

where $a_2$ is the antenna gain between the second transmit antenna and the second receive antenna and $\tilde{b}$ is the estimated value of the atmospheric attenuation.

Thus, based on the particular nature of the channel between the satellite and the receiver Rec, the present invention is able to estimate the quality of the interfering channel, without prior knowledge of the interferer and without any interference mitigation schemes implemented at the transmitter side.

According to a particular feature, the method comprises further steps of:

checking the reliability of the estimated interferer power, implementing interference mitigation techniques if the estimated interferer power is reliable.

Thus, complexity is reduced by implementing interference mitigation only when the interferer is reliably estimated.

According to still another aspect, the present invention concerns computer programs which can be directly loadable into a programmable device, comprising instructions or portions of code for implementing the steps of the method according to the invention, when said computer programs are executed on a programmable device.

Since the features and advantages relating to the computer programs are the same as those set out above related to the method and device according to the invention, they will not be repeated here.

The characteristics of the invention will emerge more clearly from a reading of the following description of example embodiments, the said description being produced with reference to the accompanying drawings, among which:

DESCRIPTION OF EMBODIMENTS

Figure 1:
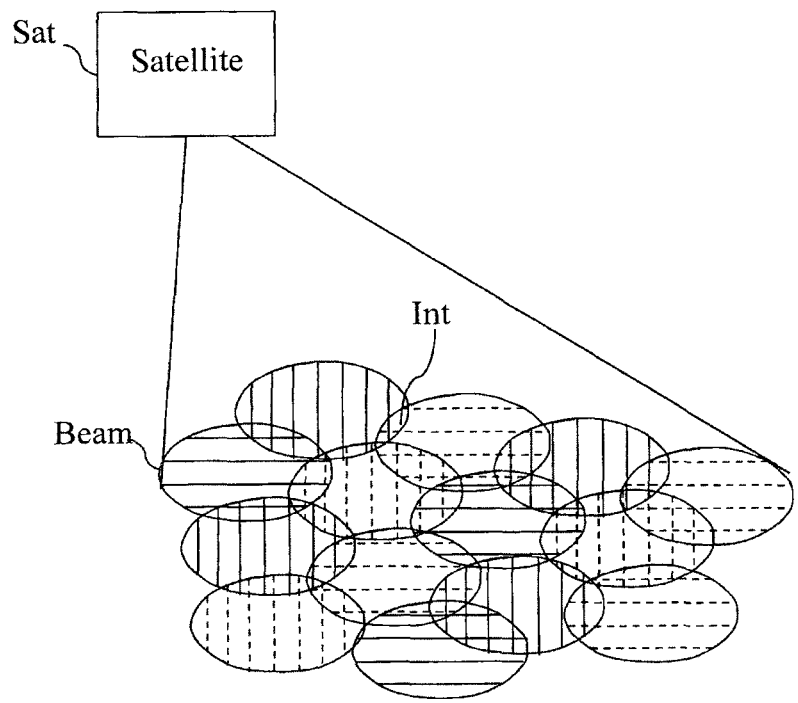
FIG. 1 represents a multi-beam transmission performed by a satellite.

FIG. 1 represents a multi-beam transmission performed by a satellite.

In the example of FIG. 1, a satellite Sat performs a multi-beam transmission on two different frequency bands using different polarizations.

The beams filed with vertical solid lines are on a first frequency band and at a first polarization, the beams filed with vertical dotted lines are on a second frequency band and at the first polarization, the beams filed with horizontal solid lines are on the second frequency band and at the second polarization and the beams filed with horizontal dotted lines are on the first frequency band and at the second polarization.

When beams are overlapping and use the same frequency band with different polarizations and impairments appear when the polarized waveform travels through the troposphere, the orthogonality may be lost, which leads to crosstalk between the two polarizations. Crosspolar interference causes performance degradation at the receiver side.

According to the example of FIG. 1, the area Int is a zone wherein beams use the same frequency band with different polarizations and are overlapping.

According to the invention, a receiver Rec, not shown in FIG. 1:
- obtains the antenna gains between the satellite transmitter and the receiver,
- estimates an atmospheric attenuation between the satellite transmitter and the receiver taking into account that the atmospheric attenuation is quasi static and dependent on atmospheric conditions in the area the receiver is located,
- estimates a crosspolar attenuation,
- estimates the channel between the first antenna and the receiver taking into account that the channel is static during the transfer of the frame,
- estimates the channel between the second antenna and the receiver from the antenna gain between the second antenna and the receiver and from the atmospheric attenuation,
- estimates the interferer power from the obtained antennas gains and estimations.

Figure 2:
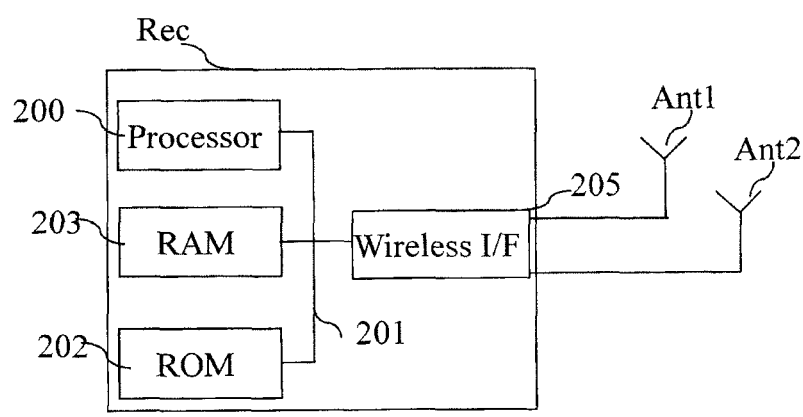
FIG. 2 is a diagram representing the architecture of a receiver in which the present invention is implemented.

FIG. 2 is a diagram representing the architecture of a receiver in which the present invention is implemented.

Figure 4:
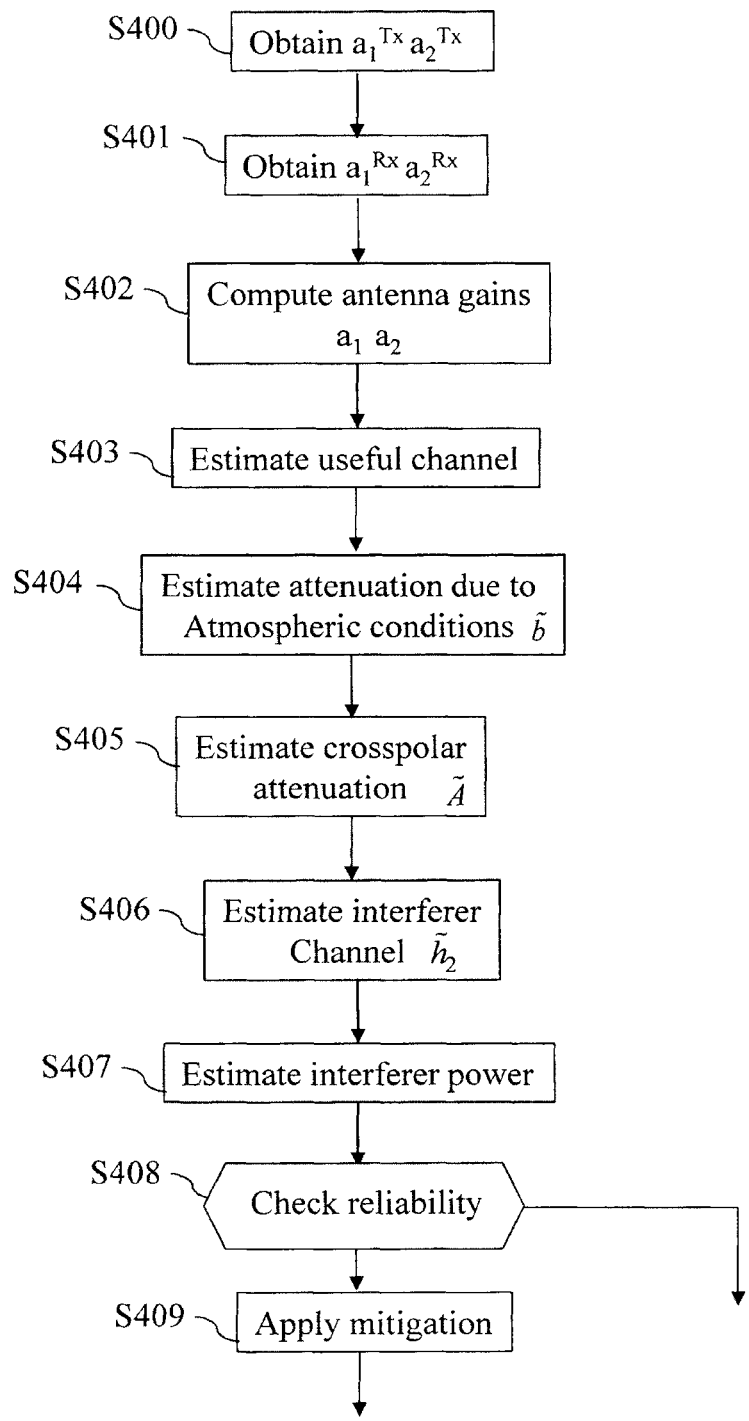
FIG. 4 represents an algorithm executed by the receiver Rec according to the present invention.

The receiver Rec has, for example, an architecture based on components connected together by a bus 201 and a processor 200 controlled by the programs as disclosed in FIG. 4.

The bus 201 links the processor 200 to a read only memory ROM 202, a random access memory RAM 203 and a wireless interface 205.

The memory 203 contains registers intended to receive variables and the instructions of the programs related to the algorithm as disclosed in FIG. 4.

The processor 200 controls the operation of the wireless interface 205.

The read only memory 202 contains instructions of the programs related to the algorithm as disclosed in FIG. 4, which are transferred, when the receiver Rec is powered on, to the random access memory 203.

The wireless interface 205 comprises two antennas Ant1 and Ant2 capable of detecting the two different polarizations.

Any and all steps of the algorithms described hereafter with regard to FIG. 4 may be implemented in software by execution of a set of instructions or program by a programmable computing machine, such as a PC (Personal Computer), a DSP (Digital Signal Processor) or a microcontroller; or else implemented in hardware by a machine or a dedicated component, such as an FPGA (Field-Programmable Gate Array) or an ASIC (Application-Specific Integrated Circuit).

In other words, the receiver Rec includes circuitry, or a device including circuitry, causing the receiver Rec to perform the steps of the algorithm described hereafter with regard to FIG. 4.

Figure 3:
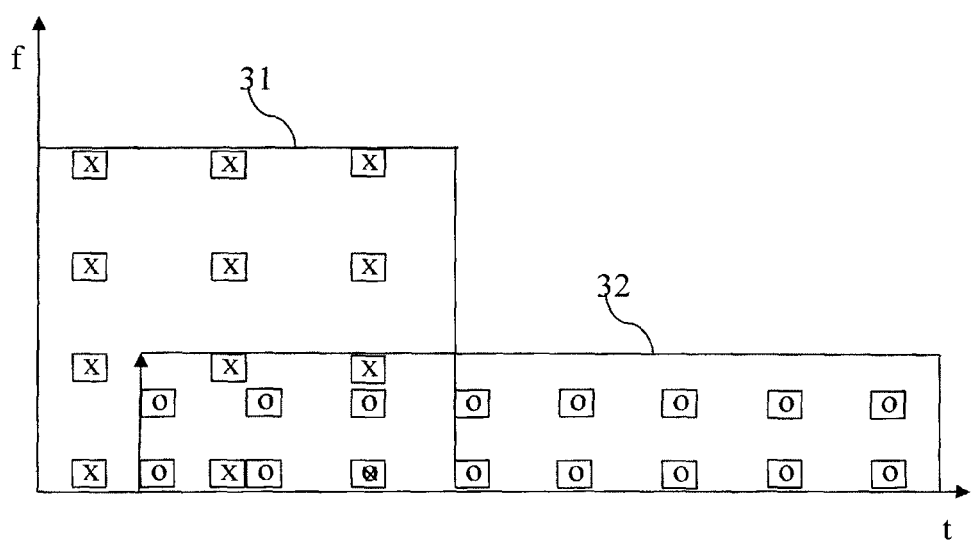
FIG. 3 represents an example of a crosspolar interferer frame overlapping in the time and frequency planes with the useful data frame at the receiver side.

FIG. 3 represents an example of a crosspolar interferer frame overlapping in the time and frequency planes with the useful data frame at the receiver side.

The horizontal axis represents the time plane and the vertical axis represents the frequency plane.

A first frame 31 is sent on one polarization, and a second frame 32 is sent on a second polarization by the satellite Sat.

Without loss of generality, let us assume that frame 31 is the useful signal intended for the receiver Rec and that frame 32 is intended for another receiver in an adjacent beam. When the polarized waveform travels through the troposphere, impairments appear, the orthogonality is lost, which leads to crosstalk between the two polarizations and thus the second frame 32 becomes a crosspolar interferer for the first frame 31.

The frames 31 and 32 may have a different length, as shown in FIG. 3 and may totally or partially overlap each other in the time and/or frequency planes. Both frames 31 and 32 may contain data and pilots. The pilot positions of frame 31 are noted x and the pilot positions of frame 32 are noted o.

The useful frame 31 and the interfering frame 32 are not aligned and the transmission of their respective pilot sequences is not coordinated. The two frames have different start/end positions in the time plane and they occupy different bandwidths. Data/pilots of frame 31 may be interfered by data/pilots of frame 32 or may be interference free. The receiver Rec has no prior knowledge of the existence, position or structure of the interfering frame 32.

FIG. 4 represents an algorithm executed by the receiver Rec according to the present invention. More precisely, the present algorithm is executed by the processor 200 of the receiver Rec.

At step S400, the processor 200 obtains the transmit antenna gains $a_1^{Tx}$ and $a_2^{Tx}$ at the satellite Sat side.

The wireless interface 205 detects simultaneously both polarizations. In the absence of an interferer, the received signal on the two polarizations may be written as:

$$y_1 = h_1 s_1 + n_1$$

$$y_2 = h_1 A s_1 + n_2$$

where $s_1$ is the symbol transmitted by the satellite Sat on one polarization and intended for the receiver Rec, $h_1$ is the channel experienced by the symbol transmitted from the satellite Sat on said polarization and received by the receiver Rec, A is the crosspolar attenuation and $n_1$, $n_2$ represent the additive white Gaussian noise of variance $\sigma_n^2$ on the two receive antennas.

In the presence of an interferer, the above equation rewrites as $$y_1' = h_1 s_1 + h_2 A s_2 + n_1$$

$$y_2' = h_1 A s_1 + h_2 s_2 + n_2$$

where $s_2$ is the interfering symbol transmitted by the satellite Sat on the second polarization intended for another receiver and $h_2$ is the channel experienced by the interfering symbol transmitted from the satellite Sat on the other polarization and received by the receiver Rec.

The channel between the satellite Sat and the receiver Rec is supposed static during the transmission. Since the receiver Rec is at a given and stable position and in line of sight with the satellite Sat, the channel between the satellite Sat and the receiver Rec can be decomposed as:

$$h_1 = a_1 b$$

$$h_2 = a_2 b$$

where $a_1$ and $a_2$ represent antenna gains and b is the attenuation due to atmospheric conditions. Since for a given receiver Rec not moving during the transmission, the distance between the satellite Sat and the receiver Rec does not change, the free space propagation loss between the satellite Sat and the receiver Rec is known and may be omitted in the following. It can be considered as included either in the antenna gains or in the atmospheric attenuation. This propagation loss will not be mentioned explicitly any longer and it is omitted in the following.

b is the atmospheric attenuation due to atmospheric conditions. Atmospheric attenuation b is quasi-static and is given by the atmospheric conditions in the reception area. Atmospheric attenuation b is thus the same for both polarizations. Crosspolar attenuation A depends on the atmospheric attenuation b.

The antenna gains $a_1$ and $a_2$ are different for the two polarizations.

Each of them are composed of a transmit antenna gain $a_i^{Tx}$ at the satellite Sat side depending on the radiation pattern on the satellite Sat and a receive antenna gain $a_i^{Rx}$ at the receiver Rec depending on the antenna characteristics of the receiver Rec. Moreover, $a_i = a_i^{Tx} a_i^{Rx}$, with $i = \{1,2\}$. The transmit antenna patterns may be different for the two polarizations.

For example, the signal intended to the receiver Rec is received in the direction of the main lobe of the satellite antenna for one polarization, while the crosspolar interfering signal may be received in the direction of a secondary lobe, the main lobe of the crosspolar transmission creating the adjacent beam.

The satellite Sat antenna transmit pattern creates at the terrestrial surface a footprint.

A fixed receiver Rec is able to know the satellite footprint corresponding to its location, and is thus able to know the transmit antenna gains $a_1^{Tx}$ and $a_2^{Tx}$ at the satellite Sat side, via a map or other information provided by the satellite operator and stored in the RAM memory 203.

The transmit antenna gains value $a_1^{Tx}$ and $a_2^{Tx}$ at the satellite Sat side are quasi-static for fixed receivers and are to be updated only in case of changes in the configuration of the satellite beams, or a change of position of the receiver Rec for example.

Periodic or on-request updates transmit antenna gains values $a_1^{Tx}$ and $a_2^{Tx}$ may be executed by the processor 200. The same reasoning stands for the attenuation due to free space propagation loss between the satellite Sat and the receiver Rec.

At next step S401, the processor 200 obtains the receive antenna gains $a_1^{Rx}$, $a_2^{Rx}$ of the receiver Rec.

The receiving antennas Ant1 and Ant2 characteristics are known by the processor 200 and stored in the ROM memory 202, as they are a build-in parameter, but the receive antenna gains $a_1^{Rx}$, $a_2^{Rx}$ may vary in function of the quality of the antennas alignment for example.

The processor 200 is able to estimate or acquire knowledge of receive antenna gains $a_1^{Rx}$, $a_2^{Rx}$ during a calibration phase. Such a calibration may occur, for example, at each position change of the receiver Rec, or on regular basis. Usually, $a_1^{Rx} = a_2^{Rx}$.

At next step S402, the processor 200 computes $a_1 = a_1^{Tx} a_1^{Rx}$ and $a_2 = a_2^{Tx} a_2^{Rx}$.

At next step S403, the processor 200 estimates the useful channel $\tilde{h}_1$ using any classical channel estimation methods, as, for example, based on pilot symbols.

At next step S404, the processor 200 computes the estimated value $\tilde{b}$ of the atmospheric attenuation b.

On pilot positions, the transmitted useful signal is a known training sequence z. The receiver Rec has no knowledge of the nature of the interfering signal transmitted on the same positions. The processor 200 computes, on pilot positions:

$$E\{z^* y_1'\} = E\{z^*(h_1 z + h_2 A s_2 + n_1)\} = h_1 E\{|z|^2\} = a_1 b E\{|z|^2\}$$

$$E\{z^* y_2'\} = E\{z^*(h_1 A z + h_2 s_2 + n_2)\} = h_1 A E\{z^2\} = a_1 b A E\{|z|^2\}$$

where $E\{.\}$ is the mean value, z denotes pilot symbols and * denotes the complex conjugate. These average values may be computed including at most all the pilot symbols in the received frame. Less positions may be considered in order to reduce the number of computations. In that case, a sufficient number of pilot symbols needs to be averaged in order for the statistic to be reliable. The processor 200 can thus calculate the estimated value $\tilde{b}$ of atmospheric attenuation b as:

$$\tilde{b} = E\{z^* y_1'\} / (a_1 E\{|z|^2\})$$

In a variant, the estimated value $\tilde{b}$ of atmospheric attenuation b can also be computed as:

$$\tilde{b} = \tilde{h}_1 / a_1$$

At next step S405, the processor 200 computes the estimated value $\tilde{A}$ of the crosspolar attenuation A as:

$$\tilde{A} = E\{z^* y_2'\} / (a_1 \tilde{b} E\{|z|^2\})$$

Another means of computing the estimated value $\tilde{A}$ of the crosspolar attenuation is to compute:

$$\tilde{A} = E\{z^* y_2'\} / E\{z^* y_1'\}$$

or to compute $$\tilde{A} = E\{z^* y_2'\} / (\tilde{h}_1 E\{|z|^2\})$$

In the absence of a second receive antenna, the processor 200 may use empirical curves giving average crosspolar attenuation values in function of the carrier frequency and of the atmospheric attenuation b in order to compute the estimated value $\tilde{A}$ of the crosspolar attenuation.

At next step S406, the processor 200 computes the estimated value $\tilde{h}_2$ of the interferer channel.

Based on the particular nature of the channel between the satellite Sat and the receiver Rec, the processor 200 is able to estimate the quality of the interfering channel, without prior knowledge of the interferer and without any interference mitigation schemes implemented at the transmitter side as $$\tilde{h}_2 = a_2 \tilde{b}$$

At next step S407, the processor 200 estimates the interferer's power $\sigma_{s_2}^2$.

From the received signal on pilot positions and using the estimates computed here-above, the processor 200 computes:

$$E\{|y_1' - a_1 \tilde{b} z|^2\} = E\{|a_2 \tilde{b} \tilde{A} s_2|^2\} + E\{|n_1|^2\} + \varepsilon_1 = |a_2 \tilde{b} \tilde{A}|^2 \sigma_{s_2}^2 + \sigma_n^2 + \varepsilon_1$$

$$E\{|y_2' - a_1 \tilde{b} \tilde{A} z|^2\} = E\{|a_2 \tilde{b} s_2|^2\} + E\{|n_2|^2\} + \varepsilon_2 = |a_2 \tilde{b}|^2 \sigma_{s_2}^2 + \sigma_n^2 + \varepsilon_2$$

where $\sigma_X^2$ is the variance of X when X has zero mean, and $\varepsilon_1$, $\varepsilon_2$ are models estimation errors. These average values may be computed on all pilot symbols occupying several subcarriers/time slots during which the nature of the interference does not change.

If the noise variance is known and the estimation errors $\varepsilon_1$, $\varepsilon_2$ are assumed negligible, the estimated value of the interferer power may be computed as $$\tilde{\sigma}_{s_2}^2 = \frac{(E\{|y_1' - a_1\tilde{b}z|^2\} - \sigma_n^2) \cdot |a_2\tilde{b}\tilde{A}|^2 + (E\{|y_2' - a_1\tilde{b}\tilde{A}z|^2\} - \sigma_n^2) \cdot |a_2\tilde{b}|^2}{|a_2\tilde{b}\tilde{A}|^4 + |a_2\tilde{b}|^4}$$

where the averaging function $E\{.\}$ operates over several subcarriers/time slots during which the nature of the interference does not change.

The processor 200 has thus computed estimated values of the useful channel, interferer channel and interferer power, and has knowledge of the noise variance.

If the noise variance is not known, the interference power may be estimated as:

$$\tilde{\sigma}_{s_2}^2 = (E\{|y_1'-a_1\tilde{b}z|^2\}-E\{|y_2'-a_1\tilde{b}\tilde{A}z|^2\})/(|a_2\tilde{b}\tilde{A}|^2-|a_2\tilde{b}|^2)$$

where the averaging function $E\{.\}$ operates over several subcarriers/time slots during which the nature of the interference does not change.

According to a particular mode of realization of the present invention, the processor 200 may use the estimated value of the interference power in order to compute in two different manners the estimated value of the noise variance:

$$\tilde{\sigma}'_n{}^2 = E\{|y_1'-a_1\tilde{b}z|^2\} - |a_2\tilde{b}\tilde{A}|^2\tilde{\sigma}_{s_2}^2$$

$$\tilde{\sigma}''_n{}^2 = E\{|y_2'-a_1\tilde{b}\tilde{A}z|^2\} - |a_2\tilde{b}|^2\tilde{\sigma}_{s_2}^2$$

When the noise variance is not known, the processor 200 moves to step S408 and checks if the two estimates $\tilde{\sigma}'_n{}^2$ and $\tilde{\sigma}''_n{}^2$ are consistent.

If the two estimates $\tilde{\sigma}'_n{}^2$ and $\tilde{\sigma}''_n{}^2$ are consistent, e.g. their difference is below a given threshold like for example less than ten percent of difference, or $\tilde{\sigma}'_n{}^2/\tilde{\sigma}''_n{}^2$ is close to 1, the processor 200 determines that the suppositions here-above were correct, that estimation errors are negligible and the processor 200 determines a reliable estimated value of the noise variance as:

$$\tilde{\sigma}_n^2 = E\{\tilde{\sigma}'_n{}^2, \tilde{\sigma}''_n{}^2\}.$$

Since the noise variance does not change during a received frame, several individual values $\tilde{\sigma}_n^2$, each one being obtained on an interval during which the interference nature does not change, may be further averaged together in order to improve the reliability of the estimated value of the noise variance.

The processor 200 has thus computed estimated values of the useful channel, interferer channel, interferer power and noise variance. The processor 200 moves then to step S409.

If the two estimates $\tilde{\sigma}''_n{}^2$ and $\tilde{\sigma}''_n{}^2$ are not consistent, the processor 200 determines that the estimation errors are too high and decides not to apply any interference mitigation techniques. The processor 200 interrupts the present algorithm.

According to a particular mode of realization, when the noise variance $\sigma_n^2$ is known or was elsewhere estimated by different means, the processor 200 may compute at step S408 the estimated value of the noise variance following the exact same procedure as described here-above in the case where the noise variance is not known.

As a supplementary reliability check, if the estimated value $\tilde{\sigma}_n^2$ is consistent with the known value $\sigma_n^2$ the processor 200 decides that estimation errors are negligible and proceeds to implementing interference mitigation techniques. The processor 200 moves then to step S409.

If the estimated value $\tilde{\sigma}_n^2$ is not consistent with the known value $\sigma_n^2$, the processor 200 determines that the estimation errors are too high and decides not to apply any interference mitigation techniques. The processor 200 interrupts the present algorithm.

At step S409, the receiver Rec is able to implement interference mitigation techniques such as, for example, joint minimum mean square error (MMSE) detection. It has to be noted here that, without further knowledge on the interferer, the receiver Rec is not able to estimate the interferer stream or apply successive interference cancellation, but the receiver Rec is able to improve the detection of the useful signal.

Naturally, many modifications can be made to the embodiments of the invention described above without departing from the scope of the present invention.

The invention claimed is:

1. A method for determining a power of at least one crosspolar interferer in a frame received by a receiver comprising at least a first and a second receive antenna detecting a first and a second polarization, the frame being transmitted from a satellite transmitter comprising at least a first and a second transmit antenna, the first transmit antenna being used for transferring a signal representative of the frame to the receiver on the first polarization, the second transmit antenna being used for transferring a signal to another receiver using a same frequency as the first transmit antenna and the second polarization, wherein the method comprises:
   obtaining antenna gains between the first transmit antenna of the satellite transmitter and the receiver and between the second transmit antenna of the satellite transmitter and the receiver,
   estimating a value of atmospheric attenuation between the satellite transmitter and the receiver,
   estimating a value of crosspolar attenuation,
   estimating a channel between the first transmit antenna and the receiver taking into account that the channel is static during the transfer of the frame,
   estimating a channel between the second transmit antenna and the receiver from the antenna gain between the second transmit antenna and the receiver and from the estimated atmospheric attenuation,
   estimating the power of the at least one crosspolar interferer from the obtained antennas gains, the estimated values, and the estimated channels.

2. The method according to claim 1, wherein the antenna gains between the satellite transmitter and the receiver are obtained from information related to a location of the receiver, related to the satellite transmitter and related to characteristics of the receiver antennas.

3. The method according to claim 1, wherein the estimated value of the atmospheric attenuation is computed based on signals received by the receiver through the first receive antenna on pilot symbol positions in the frame transferred by the satellite transmitter through the first transmit antenna.

4. The method according to claim 3, wherein the estimated value of the atmospheric attenuation is determined according to the following formula:

$$\tilde{b}=E\{z^*y_1'\}/(a_1E\{|z|^2\})$$

where $E\{.\}$ is a mean value computed on at most all the pilot symbol positions in the frame, z denotes pilot symbols, * denotes a complex conjugate, $y_1'$ is the signal received by the receiver through the first receive antenna on pilot symbol positions in the frame transferred by the satellite transmitter through the first transmit antenna, and $a_1$ is an antenna gain between the first transmit antenna and the first receive antenna.

5. The method according to claim 3, wherein the estimated value of the atmospheric attenuation is determined according to the following formula:

$$\tilde{b}=\tilde{h}_1/a_1$$

where $a_1$ is an antenna gain between the first transmit antenna and the first receive antenna and $\tilde{h}_1$ is the estimated value of the channel between the first transmit antenna and the receiver.

6. The method according to claim 3, wherein the estimated value of the crosspolar attenuation is computed based on the estimated value of the atmospheric attenuation.

7. The method according to claim 6, characterized in that the estimated value of the crosspolar attenuation is computed as:

$$\tilde{A}=E\{z^*y_2'\}/(a_1\tilde{b}E\{|z|^2\})$$

where $y_2'$ is the signal received by the receiver through the second receive antenna on positions corresponding to pilot symbol positions in the frame transferred by the satellite transmitter through the first transmit antenna.

8. The method according to claim 1, wherein the estimated value of the crosspolar attenuation is computed as $$\tilde{A}=E\{z^*y_2'\}/E\{z^*y_1'\}$$

or $$\tilde{A}=E\{z^*y_2'\}/(\tilde{h}_1E\{|z|^2\})$$

where $y_1'$ is the signal received by the receiver through the first receive antenna on pilot symbol positions in the frame, $y_2'$ is the signal received by the receiver through the second receive antenna on positions corresponding to pilot symbol positions in the frame transferred by the satellite transmitter through the first transmit antenna and $\tilde{h}_1$ is the estimated value of the channel between the first transmit antenna and the receiver.

9. The method according to claim 1, wherein the estimated interferer power is $$\tilde{\sigma}_{s_2}^2 = \frac{(E\{|y_1'-a_1\tilde{b}z|^2\}-\sigma_n^2)\cdot|a_2\tilde{b}\tilde{A}|^2 + (E\{|y_2'-a_1\tilde{b}\tilde{A}z|^2\}-\sigma_n^2)\cdot|a_2\tilde{b}|^2}{|a_2\tilde{b}\tilde{A}|^4 + |a_2\tilde{b}|^4}$$

where $a_2$ is an antenna gain between the second transmit antenna and the second receive antenna, the averaging function $E\{.\}$ operates over several subcarriers/time slots of the frame during which the nature of the interference does not change and $\sigma_n^2$ is the variance of additive white Gaussian noise on the antennas of the receiver.

10. The method according to claim 1, wherein the estimated interferer power is $$\tilde{\sigma}_{s_2}^2=(E\{|y_1'-a_1\tilde{b}z|^2\}-E\{|y_2'-a_1\tilde{b}\tilde{A}z|^2\})/(|a_2\tilde{b}\tilde{A}|^2-|a_2\tilde{b}|^2)$$

where $a_2$ is an antenna gain between the second transmit antenna and the second receive antenna, the averaging function $E\{.\}$ operates over several subcarriers/time slots during which the nature of the interference does not change.

11. The method according to claim 1, wherein the estimated value of the channel between the second transmit antenna and the receiver $\tilde{h}_2$ is estimated by computing:

$$\tilde{h}_2=a_2\tilde{b}$$

where $a_2$ is an antenna gain between the second transmit antenna and the second receive antenna and $\tilde{b}$ is the estimated value of the atmospheric attenuation.

12. The method according to claim 1, wherein the method further comprises:
checking a reliability of the estimated interferer power,
implementing interference mitigation techniques if the estimated interferer power is reliable.

13. A device for determining a power of at least one crosspolar interferer in a frame received by a receiver comprising at least a first and a second receive antenna detecting a first and a second polarization, the frame being transmitted from a satellite transmitter comprising at least a first and a second transmit antenna, the first transmit antenna being used for transferring a signal representative of the frame to the receiver on the first polarization, the second transmit antenna being used for transferring a signal to another receiver using a same frequency as the first transmit antenna and the second polarization, wherein the device comprises:
a processor; and
a memory storing instructions which, when executed by the processor, performs a process including:
obtaining antenna gains between the first transmit antenna of the satellite transmitter and the receiver and between the second transmit antenna of the satellite transmitter and the receiver,
estimating a value of atmospheric attenuation between the satellite transmitter and the receiver,
estimating a value of crosspolar attenuation,
estimating a channel between the first transmit antenna and the receiver taking into account that the channel is static during the transfer of the frame,
estimating a channel between the second transmit antenna and the receiver from the antenna gain between the second transmit antenna and the receiver and from the estimated atmospheric attenuation,
estimating the power of the at least one crosspolar interferer from the obtained antennas gains, the estimated values, and the estimated channels.

* * * * *